(12) United States Patent
Bahjat (10) Patent No.: US 9,621,348 B2
(45) Date of Patent: Apr. 11, 2017

(54) SYSTEM AND METHOD OF SECURE TEXT GENERATION

(71) Applicant: Ahmed Abdullah Bahjat, Fairfax, VA (US)

(72) Inventor: Ahmed Abdullah Bahjat, Fairfax, VA (US)

( * ) Notice: Subject to any disclaimer, the term of this patent is extended or adjusted under 35 U.S.C. 154(b) by 477 days.

(21) Appl. No.: 14/305,447

(22) Filed: Jun. 16, 2014

(65) Prior Publication Data

US 2016/0112198 A1 Apr. 21, 2016

(51) Int. Cl.
*H04L 9/00* (2006.01)
*H04L 9/32* (2006.01)

(52) U.S. Cl.
CPC .................. *H04L 9/3226* (2013.01)

(58) Field of Classification Search
CPC . H04L 9/00; H04L 9/32; H04L 9/3226; H04L 63/083
USPC .......................................................... 713/184
See application file for complete search history.

(56) References Cited

U.S. PATENT DOCUMENTS

| | | | | |
|---|---|---|---|---|
| 4,658,093 A * | 4/1987 | Hellman | .................. | G06F 21/10 380/282 |
| 6,643,784 B1 * | 11/2003 | McCulligh | ............ | H04L 63/083 704/10 |
| 6,996,718 B1 * | 2/2006 | Henry | ..................... | G06F 21/41 713/182 |
| 7,171,679 B2 * | 1/2007 | Best | ........................ | G06F 21/46 380/44 |
| 7,499,940 B1 * | 3/2009 | Gibbs | ............... | G06F 17/30887 |
| 8,238,552 B2 * | 8/2012 | Weber | ................... | G06F 21/606 380/44 |
| 8,520,848 B1 | 8/2013 | Liu et al. | | |
| 8,892,897 B2 * | 11/2014 | Swann | ..................... | G06F 21/46 713/182 |
| 8,984,599 B2 * | 3/2015 | Bodavula | ................ | G06F 21/31 713/182 |
| 2002/0087890 A1 * | 7/2002 | Chan | ....................... | G06F 21/41 726/5 |
| 2003/0041251 A1 * | 2/2003 | Kumhyr | .................. | G06F 21/31 713/184 |
| 2005/0071645 A1 * | 3/2005 | Girouard | ................ | G06F 21/31 713/183 |

(Continued)

*Primary Examiner* — Farid Homayounmehr
*Assistant Examiner* — Thanh T Le
(74) *Attorney, Agent, or Firm* — Oblon, McClelland, Maier & Neustadt, L.L.P.

(57) ABSTRACT

A device including circuitry configured to receive a security profile corresponding to one or more of a user and an application to which an output of a secure text generation process will be applied, wherein the security profile includes a private key. The circuitry may receive a sequence of characters input from a text input device in communication with the circuitry. The circuitry may generate, for each character input in the sequence of characters, one or more random characters, wherein the one or more random characters are generated based on an algorithm having the character text input and the private key as inputs, and wherein the algorithm includes a mathematical function corresponding to the private key. The secure text generation process is iteratively performed on a single character, of the sequence of characters received from the text input device, without storing preceding received characters included in the sequence of characters.

20 Claims, 5 Drawing Sheets

(56) References Cited

U.S. PATENT DOCUMENTS

| | | | | |
|---|---|---|---|---|
| 2007/0011463 A1* | 1/2007 | Garfinkle | ............ | G07C 9/00158 |
| | | | | 713/186 |
| 2008/0235772 A1* | 9/2008 | Janzen | ..................... | G06F 21/31 |
| | | | | 726/5 |
| 2009/0150991 A1* | 6/2009 | Hoey | ...................... | G06F 21/33 |
| | | | | 726/18 |
| 2009/0260077 A1* | 10/2009 | Zhu | ......................... | G06F 21/34 |
| | | | | 726/19 |
| 2010/0098246 A1* | 4/2010 | Ward | ...................... | G06F 21/34 |
| | | | | 380/44 |
| 2010/0303238 A1* | 12/2010 | Cakulev | .............. | H04L 63/0428 |
| | | | | 380/272 |
| 2012/0265988 A1 | 10/2012 | Ehrensvard | | |
| 2013/0103949 A1* | 4/2013 | Lund | ....................... | G06F 21/34 |
| | | | | 713/184 |
| 2014/0196129 A1* | 7/2014 | Amin | ...................... | H04L 63/08 |
| | | | | 726/6 |
| 2015/0082046 A1* | 3/2015 | Lucas | ................... | H04L 9/3226 |
| | | | | 713/184 |
| 2016/0285856 A1* | 9/2016 | Johansson | ............ | H04L 63/0823 |

* cited by examiner

| Security Profile Interface | |
|---|---|
| Profile Title | Email |
| Website/Program/Application | Email 1, Email 2, etc. |
| Comments | 12 characters required |
| Private Key | **************** |
| Amplification Factor | 2 |
| Default | Yes |
| Range of ASCII Characters | Uppercase Letters, Lowercase Letters, Numerals, Special Characters |

502 — Profile Title
504 — Website/Program/Application
506 — Comments
508 — Private Key
510 — Amplification Factor
512 — Default
514 — Range of ASCII Characters

*FIG. 5*

SYSTEM AND METHOD OF SECURE TEXT GENERATION

GRANT OF NON-EXCLUSIVE RIGHT

This application was prepared with financial support from the Saudia Arabian Cultural Mission, and in consideration therefore the present inventor has granted. The Kingdom of Saudi Arabia a non-exclusive right to practice the present invention.

BACKGROUND

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present disclosure.

In systems in which access is limited or protected via passwords, the use of simple passwords selected by users leaves the systems vulnerable to brute-force attack. For instance, increasingly powerful brute-force techniques for manually determining a password may result in quickly determining a simple password of eight characters. Current guidelines recommend using passwords of twelve characters or more. However, it is expected that this recommendation may soon change.

SUMMARY

Many systems nowadays require sophisticated and complex passwords. Further, with the increasing number of attacks to software systems, password guidelines become more and more restrictive. For example, system guidelines may specify password requirements related to password aging, password length, character type (e.g., including symbols and numbers), capitalization, etc.

A problem exists in that while password protection requirements are becoming more stringent, it is increasingly difficult for a user to remember relatively complex passwords that meet a given system's security guidelines. Moreover, different systems may have different password requirements (e.g., requirements for password length, types of characters, etc.), which makes it even more difficult for a user to track different passwords that may be utilized in order to meet system-specific requirements. Additionally, many systems track password histories associated with a particular user, and require that the current password be different than a predetermined number of preceding passwords, which forces the user to memorize an even greater number of passwords.

One solution that was proposed to solve this problem is using random password generators that could generate strong passwords that match any password specifications. The drawback of such solution is that it is very difficult to remember a randomly generated password. That is, users typically select passwords that include, for example, a word the user can easily remember; however, a randomly generated password will merely be a random combination of characters that the user cannot easily recall from memory. Therefore, new tools emerged that allow users to memorize a single password and encrypt all these random generated passwords in a password vault.

However, password vaults have the drawback in that they are a single point of failure. Specifically, if a hacker is able to determine the password for the vault, the all of the users' passwords are compromised.

Among other things, certain implementations of the present disclosure provide processing that generates a deterministic strong password on the fly that could be regenerated with a simple password. Certain implementations utilize two-factor authentication, such as something you have (e.g., a public key certificate or a biometric trait) along with something you know (e.g., a password or a PIN number). In certain implementations, each character in the new password is iteratively generated by encrypting a single character from the simple password and then using the encrypted character to select a new character via a mapping algorithm. Moreover, in certain implementations, password guidelines are also enforced using information extracted from the encrypted character to determine position and frequency of numbers and symbols. Lastly, certain implementations enable changing passwords by regenerated or replacing a private key utilized by the algorithm when generating the complex password. In this case, the same simple password generates a totally different complex password.

In one or more embodiments, a secure text generation apparatus includes a client device including circuitry configured to enable a secure text generation process in response to receiving an enable signal. The circuitry may receive, as a first input to the secure text generation process, a security profile corresponding to one or more of a user and a current application to which an output of the secure text generation process will be applied, wherein the security profile includes a private key. The circuitry may receive, as a second input to the secure text generation process, a sequence of characters input from a text input device in communication with the circuitry. The circuitry may generate, when the secure text generation process is enabled, for each character input in the sequence of characters, one or more random characters, wherein the one or more random characters are generated based on an algorithm having the character text input and the private key as inputs, and wherein the algorithm includes a mathematical function corresponding to the private key, wherein the secure text generation process is iteratively performed on a single character, of the sequence of characters received from the text input device, without storing preceding received characters included in the sequence of characters.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Referring now to the drawings, wherein like reference numerals designate identical or corresponding parts throughout the several views.

Figure 1:
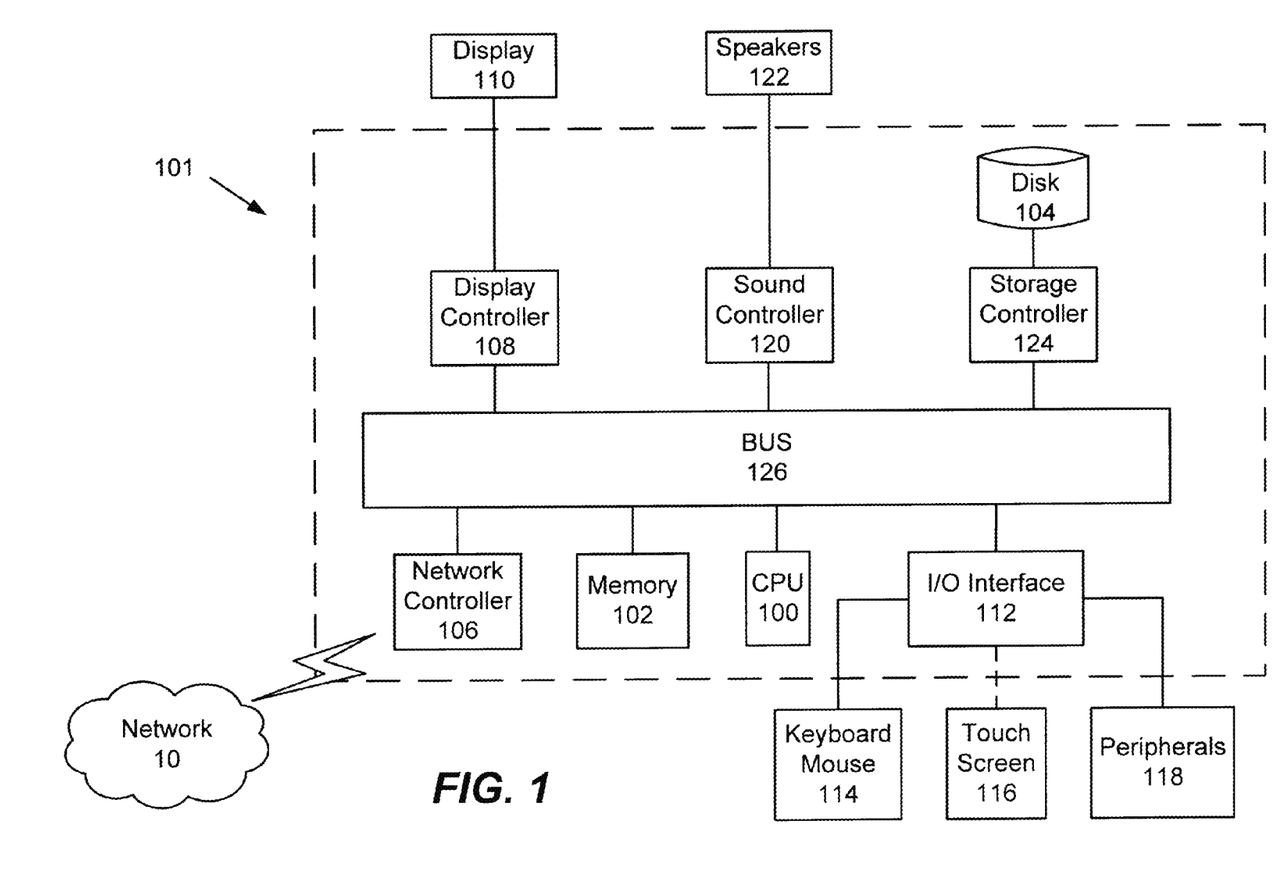
FIG. 1 illustrates a non-limiting example of a secure text generation device, according to certain embodiments.

First, a hardware description of a secure text generation apparatus 101 according to exemplary embodiments is described with reference to FIG. 1. In FIG. 1, the secure text generation apparatus 101 includes a CPU 100 that performs the processes described herein. The process data and instructions may be stored in memory 102. These processes and instructions may also be stored on a storage medium disk 104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the secure text generation apparatus 101 communicates, such as a server or computer.

Further, the claimed advancements may be provided as a utility application, background daemon, or component of an operating system, or combination thereof, executing in conjunction with CPU 100 and an operating system such as Microsoft Windows 7, UNIX, Solaris, LINUX, Apple MAC-OS and other systems known to those skilled in the art.

CPU 100 may be a Xenon or Core processor from Intel of America or an Opteron processor from AMD of America, or may be other processor types that would be recognized by one of ordinary skill in the art. Alternatively, the CPU 100 may be implemented on an FPGA, ASIC, PLD or using discrete logic circuits, as one of ordinary skill in the art would recognize. Further, CPU 100 may be implemented as multiple processors cooperatively working in parallel to perform the instructions of the inventive processes described above.

The secure text generation apparatus 101 in FIG. 1 also includes a network controller 106, such as an Intel Ethernet PRO network interface card from Intel Corporation of America, for interfacing with network 10. As can be appreciated, the network 10 can be a public network, such as the Internet, or a private network such as an LAN or WAN network, or any combination thereof and can also include PSTN or ISDN sub-networks. The network 10 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The secure text generation apparatus 101 further includes a display controller 108, such as a NVIDIA GeForce GTX or Quadro graphics adaptor from NVIDIA Corporation of America for interfacing with display 110, such as a Hewlett Packard HPL2445w LCD monitor. A general purpose I/O interface 112 interfaces with a keyboard and/or mouse 114 as well as a touch screen panel 116 on or separate from display 110. General purpose I/O interface 112 also connects to a variety of peripherals 118 including printers and scanners, such as an OfficeJet or DeskJet from Hewlett Packard.

A sound controller 120 is also provided in the secure text generation apparatus 101, such as Sound Blaster X-Fi Titanium from Creative, to interface with speakers/microphone 122 thereby providing sounds and/or music.

The general purpose storage controller 124 connects the storage medium disk 104 with communication bus 126, which may be an ISA, EISA, VESA, PCI, or similar, for interconnecting all of the components of the secure text generation apparatus 101. A description of the general features and functionality of the display 110, keyboard and/or mouse 114, as well as the display controller 108, storage controller 124, network controller 106, sound controller 120, and general purpose I/O interface 112 is omitted herein for brevity as these features are known.

In other alternate embodiments, processing features according to the present disclosure may be implemented and commercialized as hardware, a software solution, or a combination thereof. In another exemplary hardware embodiment, a keyboard manufacturer could build new and secure keyboards that accept a smartcard that includes a security profile with one or more private keys, and circuitry in the keyboard could be configured to perform a secure text generation process in accordance with the present disclosure. Moreover, instructions corresponding to a secure text generation process in accordance with the present disclosure could be stored in a thumb drive that hosts a secure process for generating the secure text on the fly. Further, aspects of the present disclosure may be implemented as a trusted operating system process or typing mode.

Figure 2:
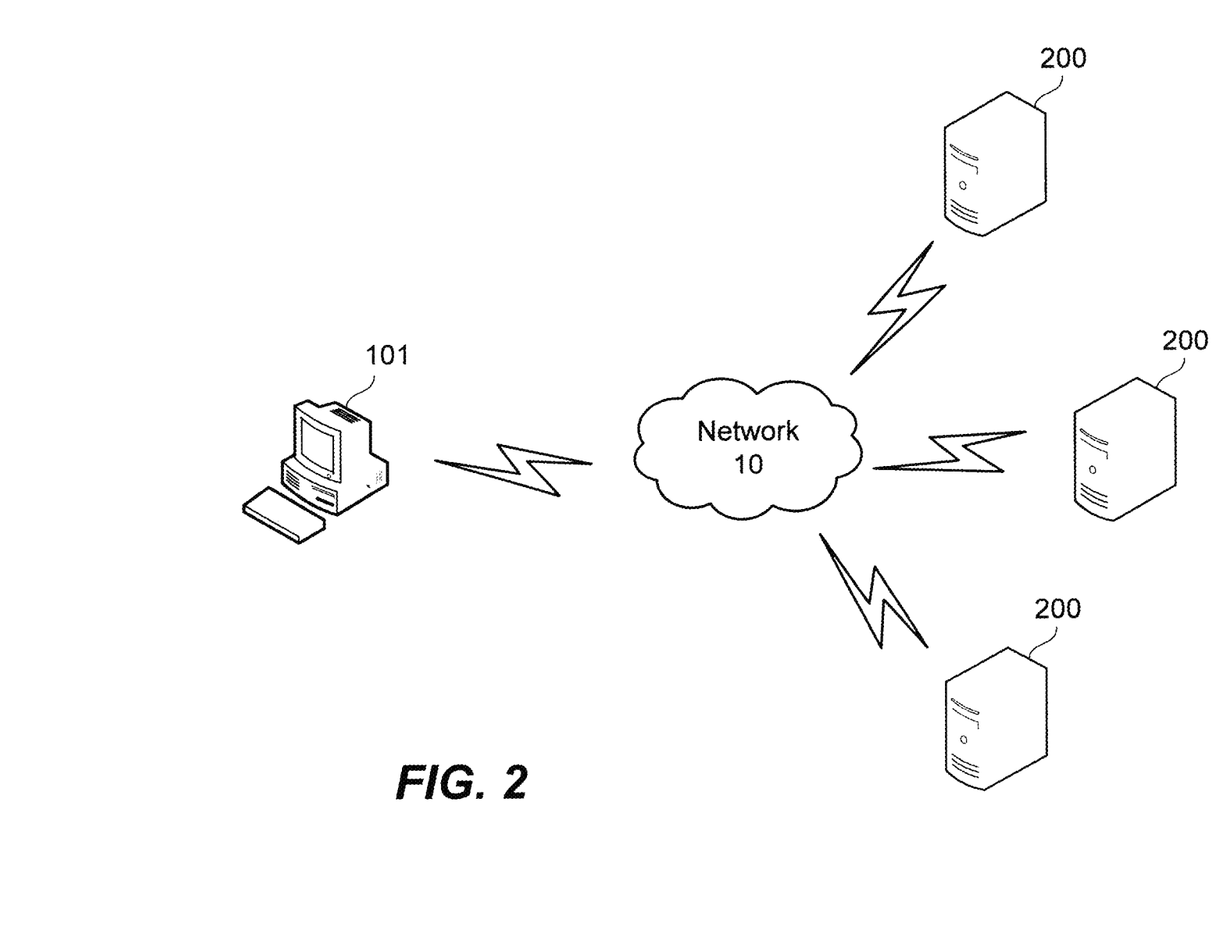
FIG. 2 illustrates an exemplary network including a secure text generation device and a plurality of servers, according to certain embodiments.

Next, FIG. 2 illustrates an exemplary network 10 including a secure text generation device and a plurality of servers, according to certain embodiments.

Referring to FIG. 2, the secure text generation apparatus 101 is shown connected to a plurality of servers 200 via the network 10. In the example of FIG. 2, the secure text generation apparatus 101 acts as a client device. In this example, each of the servers 200 may correspond to a network node to which the user wishes to access via the secure text generation apparatus 101. For example, one or more of the servers 200 may be a Web server, and the secure text generation apparatus 101 may access the Web server and download data for display on the display 110 via a browser.

Text outputs generated by a secure text generation process according to the present disclosure may be output by the secure text generation apparatus 101 and received by one of the servers 200 such that password authentication may be performed. The secure text generation process provides access, as a stand-alone on-line process, to a remote system connected to a client via a network 10, and provides, as an offline service, access to the secure text generation apparatus 101. As discussed in detail herein, the text output of the secure text generation process may be performed iteratively only on a single character received from a text input device (e.g., keyboard 114) without storing preceding received characters. In some embodiments, the secure text generation apparatus receives a full simple password and then performs a text conversion process on the entire simple password to generate a complex password. In other selected embodiments, the secure text generation process iteratively performs the process on each character of the input, and outputs the result prior to processing the next input. For example, each character in a sequence of characters may be intercepted by accessing the keyboard 114 API, and the individual characters may be processed without storing the entire sequence of characters, thereby improving the security of the process. Additionally, processing the sequence of characters in this manner allows the secure text generation process to be implemented in systems not necessarily related to password authentication, such as secure chat communications. This is different than encryption algorithms used to cipher a meaningful message or a complete password rather than a single character on the fly in that the processing of a complete word or series of words requires storage of the word or series of words, thereby introducing security risk. Processing according to the present disclosure mitigates this risk.

Figure 3:
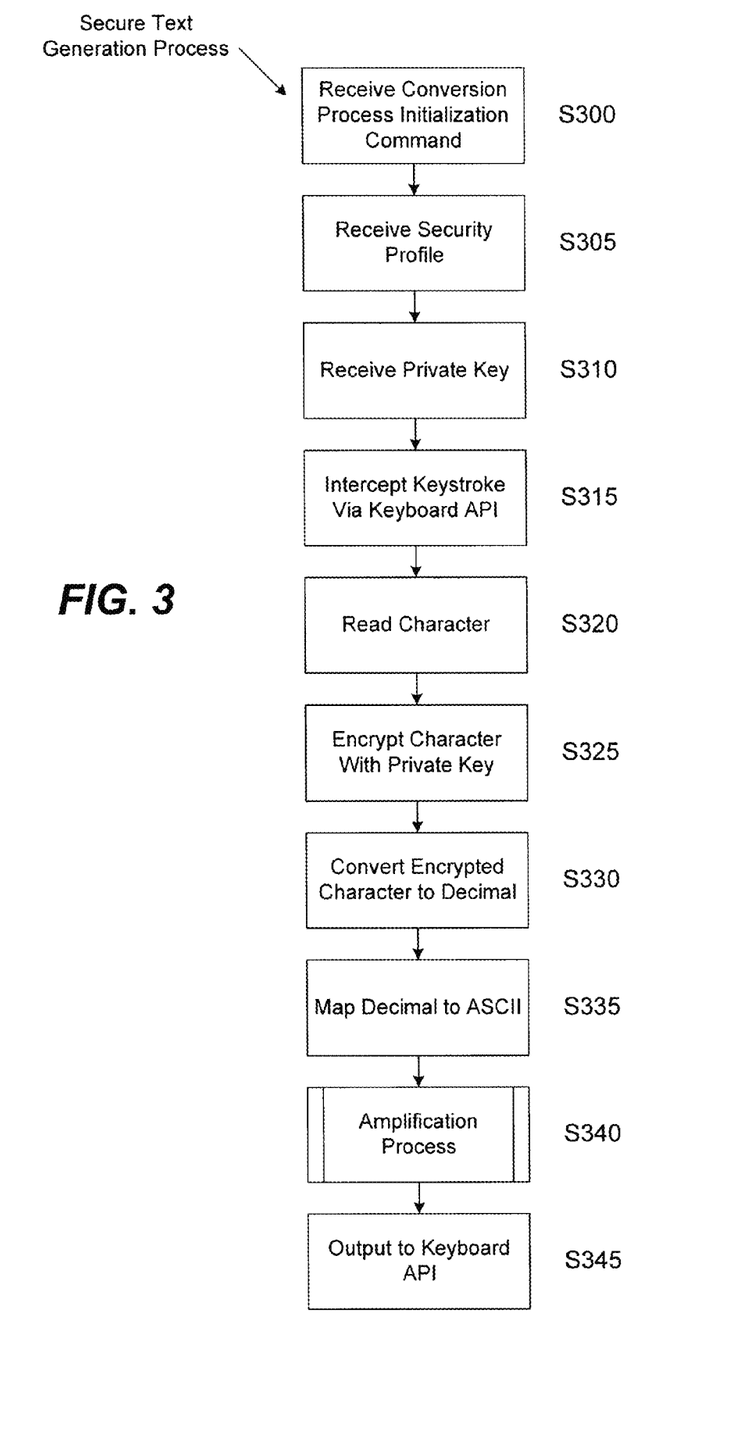
FIG. 3 illustrates a non-limiting exemplary flowchart corresponding to a secure text generation process, according to certain embodiments.

Next, FIG. 3 illustrates a non-limiting exemplary flowchart corresponding to a secure text generation process, according to certain embodiments. The secure text generation process can be isolated within the secure text generation apparatus 101 and is not dependent on intervention from a network 10, server, third-party device associated with the server, or the like.

In certain aspects, a user knows a simple password. According to some embodiments, this password may be 6 characters in length, for example, "ABCDEF." At step S300, the secure text generation apparatus 101 receives a conversion process initialization command. This initialization command may be a keystroke, a series of keystrokes, or an input from a mouse, touchscreen, and the like. In certain embodiments, the initialization command may be the keystroke F5. In another implementation, the initialization command may be placing a cursor in a password field via an interface such as a mouse. Once the initialization command is received, the interception a character of a simple password from the keyboard 114 API may commence. In certain aspects, the initialization command is also used as a termination command at the end of the secure text generation process.

Figure 5:
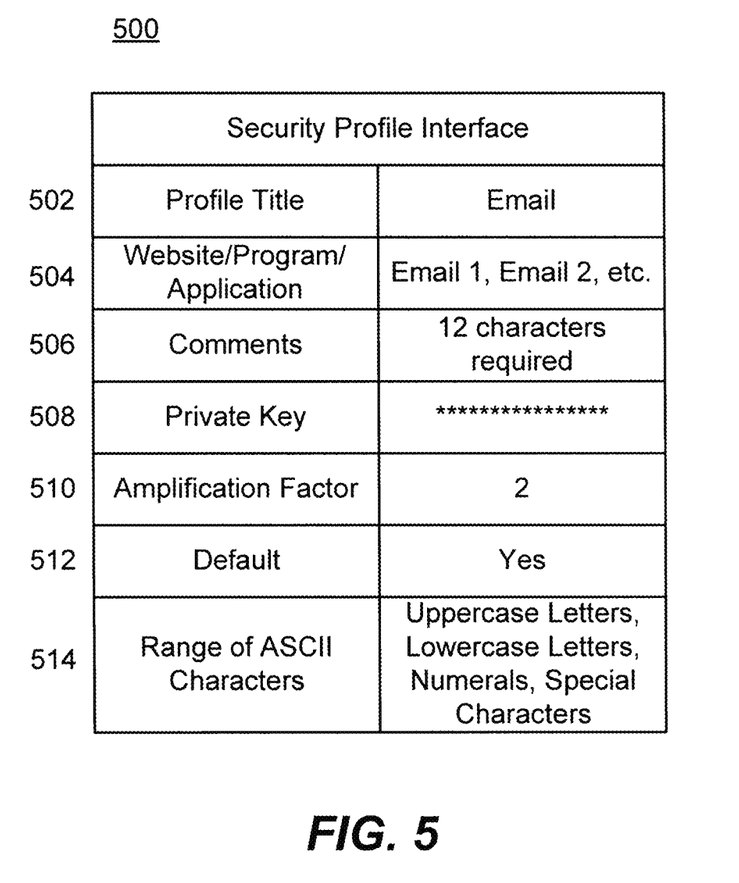
FIG. 5 illustrates a non-limiting example of a security profile interface, according to certain embodiments.

Once the initialization command has been received, at step S305, the processing circuitry receives a security profile. The user can develop one or more profiles based on a desire to have different passwords for different categories of websites, programs, and the like. FIG. 5 illustrates a non-limiting example of a security profile interface 500, according to certain embodiments. At 502, the user can designate a title for the security profile. For example, the user may entitle a security profile as "Email" that may be used for various email accounts that the user operates. At 504, the user identifies the websites, programs, applications, and the like that are associated with the security profile. In certain embodiments where the user develops a profile for email accounts, the user would identify the websites and servers that may be associated with the security profile. At 506, the user may add any comments to the security profile. In certain embodiments, the user may add a comment that reminds the user of the minimum password requirements for the passwords associated with that security profile. At 508, a unique private key is generated for the security profile. Specifically, the private key for one security profile is different from the private key associated with any other security profile. At 510, the user may designate an amplification factor for the security profile. The amplification factor defaults to a value of 2 if the user does not specify the amplification factor. At 512, the user can designate one security profile as a default security profile, and that profile is used unless the user manually changes the security profile prior to initializing the secure text generation process at step S300. At 514, the user specifies a range of allowable ASCII characters for the security profile. For example, the user may specify that uppercase letters, lowercase letters, numerals, and special characters can be generated for the passwords in the security profile.

Referring back to FIG. 3, at step S310, the processing circuitry receives a private key. The private key may be stored within a user account of an operating system, in a private location on a hard drive, on a thumb drive, or in a smartcard. One or more private keys may be received based on the user creating one or more security profiles.

At step S315, a keystroke is intercepted via the keyboard API. The user performs a keystroke corresponding to a character of the known simple password. For example, a keystroke performed by the user may be an "A," and the processing circuitry may intercept this keystroke by accessing the keyboard 114 API. At step S320, the character of the keystroke that is intercepted at step S315 is read. In the example where the keystroke "A" is intercepted by the keyboard 114 API, the character "A" is read.

At step S325, the character is encrypted with the private key. The private key that is used to encrypt the character is associated with the selected security profile. In certain embodiments, the processing circuitry encrypts the character so that a 128-bit hexadecimal hash is generated. In addition, a random 128-bit hexadecimal hash is generated based on the input character and the private key associated with the particular security profile. Specifically, the hash that is generated for one security profile will be different than the hash that is generated for any other security profile for a given input character. At step S330, the encrypted character is converted to decimal. In certain embodiments, each byte of the 128-bit hexadecimal hash is converted to decimal and then the sum of all of the converted bytes is obtained.

At step S335, the decimal obtained at step S330 is mapped to an ASCII character. In certain embodiments where the security profile specifies that uppercase letters, lowercase letters, numerals, and special characters are acceptable, the decimal that is mapped to the ASCII character may be one of 93 possible ASCII characters in the range of 33 to 126. If the decimal that is output in step S330 is greater than 93, than the arithmetic operation of module 93 is applied to the decimal. The result of the module operation is then mapped to an ASCII character. The security profile may also specify a smaller range of acceptable ASCII characters for the password, in which case the module of the smaller range of acceptable ASCII characters is applied to the decimal.

At step S340, an amplification process is executed based on the amplification factor. The amplification process is explained in detail with respect to FIG. 4. At step S345, the one or more random characters from the secure text generation process are output to the keyboard 114 API. The number of characters that are output to the keyboard 114 API is equal to 1 plus the number of recursive loops that are performed by the amplification process. In certain embodiments where the amplification factor is 2, 1 recursive loop of the amplification process is performed, and 2 characters are output to the keyboard 114 API for each character of the simple password that is input by the user. For example, for an input character of "A" and an amplification factor of 2, the secure text generation process may generate the characters "k3," which would be output to the keyboard 114 API. The output of the secure text generation process is then sent, via a network 10, to a server as an input to a password field. The secure text generation process is performed for each character in the simple password that is known by the user in order to generate a complex password. The individual characters may be processed without storing the entire sequence of characters, thereby improving the security of the process. In certain embodiments where the simple password that is known by the user is 6 characters in length and the amplification factor is 2, the secure text generation process will be performed 6 times and will generate the complex password that is 12 characters in length.

Figure 4:
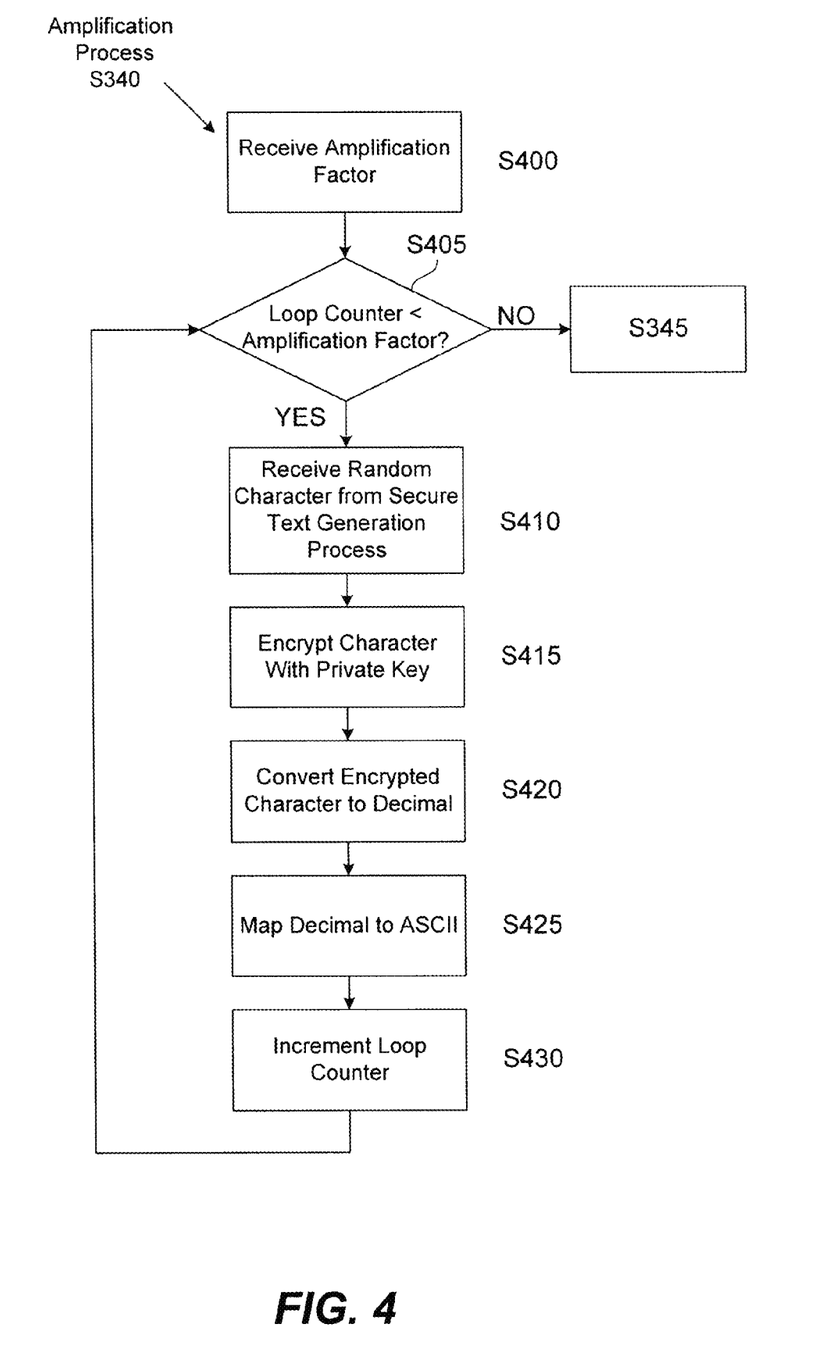
FIG. 4 illustrates a non-limiting exemplary flowchart corresponding to an amplification process, according to certain embodiments.

Next, FIG. 4 illustrates a non-limiting exemplary flowchart corresponding to an amplification process, according to certain embodiments. The purpose of the amplification process is to generate additional random characters from the input character by recursively looping through the secure text generation process a predetermined number of times. At step S400, an amplification factor is received by the processing circuitry. The amplification factor may be specified by the user as a preference in the one or more security profiles that are created. If the user does not specify an amplification factor, a default value of 2 is used. At the beginning of the secure text generation process, a loop counter is set to 1. At step S405, the loop counter is compared to the amplification factor. If the loop counter is less than the amplification factor, resulting in a "yes," the amplification process of step S340 proceeds to step S410. Otherwise, if the loop counter is greater than or equal to the amplification factor, resulting in a "no," the amplification process of step S340 is complete, and the secure text generation process proceeds to step S345.

At step S410, the random character that was generated in the secure text generation process is received. The random character that is received is the ASCII character that is generated based on the private key from the security profile in step S340 of the secure text generation process. At step S415, the character is encrypted with the private key. The private key that is used to encrypt the character is associated with the selected security profile. In certain embodiments, the processing circuitry encrypts the character so that a 128-bit hexadecimal hash is generated. In addition, a unique 128-bit hexadecimal hash is generated for each private key associated with a particular security profile. Specifically, the hash that is generated for one security profile will be different than the hash that is generated for any other security profile. At step S420, the encrypted character is converted to decimal. In certain embodiments, each byte of the 128-bit hexadecimal hash is converted to decimal and then the sum of all of the converted bytes is obtained.

At step S425, the decimal obtained at step S420 is mapped to an ASCII character. In certain embodiments where the security profile specifies that uppercase letters, lowercase letters, numerals, and special characters are acceptable, the decimal that is mapped to the ASCII character may be one of 93 possible ASCII characters in the range of 33 to 126. If the decimal that is output in step S420 is greater than 93, than the arithmetic operation of module 93 is applied to the decimal. The result of the module operation is then mapped to an ASCII character. The security profile may also specify a smaller range of acceptable ASCII characters for the password, in which case the module of the smaller range of acceptable ASCII characters is applied to the decimal. At step S430, the loop counter is incremented by 1, which is done after one recursive loop of the amplification process of step S340 has been accomplished. The loop counter is then compared to the amplification factor at step S405. If the loop counter is less than the amplification factor, the random character that was generated at step S425 is applied as an input to another recursive iteration of the amplification process.

In certain embodiments where the simple password that is known by the user is 6 characters in length, such as "ABCDEF," and the amplification factor is 2, the secure text generation process is performed 6 times and generates the complex password that is 12 characters in length. The user has to remember one simple password and have access to one or more private keys to generate one or more complex, secure passwords. In addition, the secure text generation process is executed on the fly without storing prior information pertaining to the simple or complex passwords. Neither the private key nor the sequence of characters of the simple password is stored in, or accessible by, the server. Performing the process on one character at a time also enhances the security of the secure password generation process.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) A secure text generation apparatus comprising circuitry configured to: enable a secure text generation process in response to receiving an enable signal; receive, as a first input to the secure text generation process, a security profile corresponding to one or more of a user and a current application to which an output of the secure text generation process will be applied, wherein the security profile includes a private key; receive, as a second input to the secure text generation process, a sequence of characters input from a text input device in communication with the circuitry; and generate, when the secure text generation process is enabled, for each character input in the sequence of characters, one or more random characters, wherein the one or more random characters are generated based on an algorithm having the private key and a character as inputs, and wherein the algorithm includes a mathematical function corresponding to the private key, wherein the secure text generation process is iteratively performed on each character, of the sequence of characters received from the text input device, without storing preceding received characters included in the sequence of characters.

(2) The secure text generation apparatus of (1), wherein the secure text generation process provides access, as a stand-alone on-line process, to a remote system connected to a client via a network, and provides, as an offline service, access to the secure text generation apparatus.

(3) The secure text generation apparatus of (1) or (2), wherein the secure text generation process is isolated within the secure text generation apparatus.

(4) The secure text generation apparatus of any one of (1) to (3), wherein the output of the secure text generation process is sent, via a network, to a server device as an input to a password field.

(5) The secure text generation apparatus of any one of (1) to (4), wherein the secure text generation process is performed without intervention from the server or from another third-party device affiliated with the server, and neither the private key nor the sequence of characters is stored in, or accessible by, the server.

(6) The secure text generation apparatus of any one of (1) to (5), wherein the circuitry is further configured to: control a display that outputs an interface for selecting the security profile from a plurality of security profiles, wherein the plurality of security profiles respectively correspond to one or more servers to which access is gained via the secure text generation process, and select, based on an input from the interface indicating a selected security profile, the private key from a plurality of private keys, wherein the selected private key has a predetermined correspondence to the selected security profile.

(7) The secure text generation apparatus of any one of (1) to (6), wherein the output of the algorithm implemented by the circuitry in the secure text generation process is altered, based on the selected private key, such that the algorithm generates a different output for each security profile, of the plurality of profiles, for a given character input.

(8) The secure text generation apparatus of any one of (1) to (7), wherein for each character received in the sequence of characters, the secure generation process generates a first random character based on the character input and the algorithm implemented with the private key, and following the generation of the first random character, the first random character is recursively looped back and applied as an input to the secure generation process such that another random character is generated based on the first random character and the algorithm implemented with the private key.

(9) The secure text generation apparatus of any one of (1) to (8), wherein the circuitry receives, as a third input to the secure text generation process, an amplification factor input indicating a number of recursive loops to be performed during the secure text generation process.

(10) The secure text generation apparatus of any one of (1) to (9), wherein a number of characters output during the secure text generation process as a result of entering a single character via the text input device changes based on the number of recursive loops indicated by the amplification factor.

(11) The secure text generation apparatus of any one of (1) to (10), wherein the security profile includes a range of characters that may be output by the circuitry during the secure text generation process.

(12) The secure password generation system of any one of (1) to (11), wherein the range of characters indicates one or more range limitations of an ASCII character table applied by the algorithm during the secure text generation process.

(13) A non-transitory computer-readable medium having computer-readable instructions thereon which when executed by a computer cause the computer to perform a method for secure text generation, the method comprising: enabling a secure text generation process in response to receiving an enable signal; receiving, as a first input to the secure text generation process, a security profile corresponding to one or more of a user and a current application to which an output of the secure text generation process will be applied, wherein the security profile includes a private key; receiving, as a second input to the secure text generation process, a sequence of characters input from a text input device; and generating, when the secure text generation process is enabled, for each character input in the sequence of characters, one or more random characters, wherein the one or more random characters are generated based on an algorithm having the private key and a character as inputs, and wherein the algorithm includes a mathematical function corresponding to the private key, wherein the secure text generation process is iteratively performed on each character, of the sequence of characters received from the text input device, without storing preceding received characters included in the sequence of characters.

(14) A method for secure text generation, the method comprising: enabling, at a client device, a secure text generation process in response to receiving an enable signal; receiving, at the client device, as a first input to the secure text generation process, a security profile corresponding to one or more of a user and a current application to which an output of the secure text generation process will be applied, wherein the security profile includes a private key; receiving, at the client device, as a second input to the secure text generation process, a sequence of characters input from a text input device in communication with circuitry; and generating, via a processor and when the secure text generation process is enabled, for each character input in the sequence of characters, one or more random characters, wherein the one or more random characters are generated based on an algorithm having the private key and a character as inputs, and wherein the algorithm includes a mathematical function corresponding to the private key, wherein the secure text generation process is iteratively performed on each character, of the sequence of characters received from the text input device, without storing preceding received characters included in the sequence of characters.

(15) The method of (14), wherein the output of the secure text generation process is sent, via a network, to a server device as an input to a password field.

(16) The method of (14) or (15), further comprising: controlling, at the client device, a display that outputs an interface for selecting the security profile from a plurality of security profiles, wherein the plurality of security profiles respectively correspond to one or more servers to which access is gained via the secure text generation process, and selecting, at the client device, based on an input from the interface indicating a selected security profile, the private key from a plurality of private keys, wherein the selected private key has a predetermined correspondence to the selected security profile.

(17) The method of any one of (14) to (16), wherein the output of the algorithm implemented by the circuitry in the secure text generation process is altered, based on the selected private key, such that the algorithm generates a different output for each security profile, of the plurality of profiles, for a given character input.

(18) The method of any one of (14) to (17), wherein for each character received in the sequence of characters, the secure generation process generates a first random character based on the character input and the algorithm implemented with the private key, and following the generation of the first random character, the first random character is recursively looped back and applied as an input to the secure generation process such that another random character is generated based on the first random character and the algorithm implemented with the private key.

(19) The method of any one of (14) to (18), wherein the circuitry receives, as a third input to the secure text generation process, an amplification factor input indicating a number of recursive loops to be performed during the secure text generation process.

(20) The method of any one of (14) to (19), wherein a number of characters output during the secure text generation process as a result of entering a single character via the text input device changes based on the number of recursive loops indicated by the amplification factor.

The invention claimed is:

1. A secure text generation apparatus for performing complex password generation, the apparatus comprising:
   circuitry configured to:
   enable a secure text generation process in response to receiving an enable signal,
   receive, as a first input to the secure text generation process, a security profile from a plurality of security profiles each corresponding to a user and one or more current applications to which an output of the secure text generation process will be applied, wherein the security profile includes a private key and an amplification factor set by the user, the amplification factor indicating a number of recursive loops to be performed during the secure text generation process,
   receive, as a second input to the secure text generation process, a sequence of characters input from a text input device in communication with the circuitry, and
   generate, based on the security profile and when the secure text generation process is enabled, for each character input in the sequence of characters one at a time and as each character is input from the text input device by the user, one or more random characters, wherein the one or more random characters are generated based on an algorithm having the private key and a character as inputs, and wherein the algorithm includes a mathematical function corresponding to the private key and the amplification factor, wherein
   the secure text generation process is iteratively performed on each character, of the sequence of characters received from the text input device to generate a password for the application, without storing preceding received characters included in the sequence of characters thereby improving password and system security.

2. The secure text generation apparatus of claim 1, wherein the secure text generation process provides access, as a stand-alone on-line process, to a remote system connected to a client via a network, and provides, as an offline service, access to the secure text generation apparatus.

3. The secure text generation apparatus of claim 1, wherein the secure text generation process is isolated within the secure text generation apparatus.

4. The secure text generation apparatus of claim 3, wherein the output of the secure text generation process is sent, via a network, to a server device as an input to a password field.

5. The secure text generation apparatus of claim 4, wherein
   the secure text generation process is performed without intervention from the server or from another third-party device affiliated with the server, and
   neither the private key nor the sequence of characters is stored in, or accessible by, the server.

6. The secure text generation apparatus of claim 5, wherein the circuitry is further configured to:
   control a display that outputs an interface for selecting the security profile from a plurality of security profiles, wherein the plurality of security profiles respectively correspond to one or more servers to which access is gained via the secure text generation process, and
   select, based on an input from the interface indicating a selected security profile, the private key from a plurality of private keys, wherein the selected private key has a predetermined correspondence to the selected security profile.

7. The secure text generation apparatus of claim 6, wherein the output of the algorithm implemented by the circuitry in the secure text generation process is altered, based on the selected private key, such that the algorithm generates a different output for each security profile, of the plurality of profiles, for a given character input.

8. The secure text generation apparatus of claim 7, wherein for each character received in the sequence of characters, the secure generation process generates a first random character based on the character input and the algorithm implemented with the private key, and following the generation of the first random character, the first random character is recursively looped back based on the amplification factor and applied as an input to the secure generation process such that another random character is generated based on the first random character and the algorithm implemented with the private key.

9. The secure text generation apparatus of claim 8, wherein a number of characters output during the secure text generation process as a result of entering a single character via the text input device is a multiple factor of the amplification factor.

10. The secure text generation apparatus of claim 1, wherein the security profile includes a range of characters that may be output by the circuitry during the secure text generation process.

11. The secure password generation system of claim 10, wherein the range of characters indicates one or more range limitations of an ASCII character table applied by the algorithm during the secure text generation process.

12. The secure text generation apparatus of claim 1, wherein the security profile corresponds to the user and a plurality of applications of a same category, and the private key corresponds to the plurality of applications.

13. The secure text generation apparatus of claim 12, wherein each security profile further includes information identifying a minimum number of characters required as the password for the application.

14. The secure text generation apparatus of claim 1, wherein multiple private keys are associated with each security profile, and the circuitry replaces one private key with another private key when generating, for each character input in the sequence of characters the one or more random characters.

15. A non-transitory computer-readable medium having computer-readable instructions thereon which when executed by a computer cause the computer to perform a method for secure text generation, the method comprising:

enabling a secure text generation process in response to receiving an enable signal;

receiving, as a first input to the secure text generation process, a security profile from a plurality of security profiles each corresponding to a user and one or more current applications to which an output of the secure text generation process will be applied, wherein the security profile includes a private key and an amplification factor set by the user, the amplification factor indicating a number of recursive loops to be performed during the secure text generation process;

receiving, as a second input to the secure text generation process, a sequence of characters input from a text input device; and generating, based on the security profile and when the secure text generation process is enabled, for each character input in the sequence of characters one at a time and as each character is input from the text input device by the user, one or more random characters, wherein the one or more random characters are generated based on an algorithm having the private key and a character as inputs, and wherein the algorithm includes a mathematical function corresponding to the private key and the amplification factor, wherein the secure text generation process is iteratively performed on each character, of the sequence of characters received from the text input device to generate a password for the application, without storing preceding received characters included in the sequence of characters thereby improving password and system security.

16. A method for secure text generation, the method comprising:

enabling, at a client device, a secure text generation process in response to receiving an enable signal;

receiving, at the client device, as a first input to the secure text generation process, a security profile from a plurality of security profiles each corresponding to a user and one or more current applications to which an output of the secure text generation process will be applied, wherein the security profile includes a private key and an amplification factor set by the user, the amplification factor indicating a number of recursive loops to be performed during the secure text generation process;

receiving, at the client device, as a second input to the secure text generation process, a sequence of characters input from a text input device in communication with circuitry; and generating, via a processor based on the security profile and when the secure text generation process is enabled, for each character input in the sequence of characters one at a time and as each character is input from the text input device by the user, one or more random characters, wherein the one or more random characters are generated based on an algorithm having the private key and a character as inputs, and wherein the algorithm includes a mathematical function corresponding to the private key and the amplification factor, wherein the secure text generation process is iteratively performed on each character, of the sequence of characters received from the text input device to generate a password for the application, without storing preceding received characters included in the sequence of characters thereby improving password and system security.

17. The method of claim 16, further comprising:

controlling, at the client device, a display that outputs an interface for selecting the security profile from a plurality of security profiles, wherein the plurality of security profiles respectively correspond to one or more servers to which access is gained via the secure text generation process; and selecting, at the client device, based on an input from the interface indicating a selected security profile, the private key from a plurality of private keys, wherein the selected private key has a predetermined correspondence to the selected security profile.

18. The method of claim 17, wherein the output of the algorithm implemented in the secure text generation process is altered, based on the selected private key, such that the algorithm generates a different output for each security profile, of the plurality of profiles, for a given character input.

19. The method of claim 18, wherein for each character received in the sequence of characters, the secure generation process generates a first random character based on the character input and the algorithm implemented with the private key, and following the generation of the first random character, the first random character is recursively looped back based on the amplification factor and applied as an input to the secure generation process such that another random character is generated based on the first random character and the algorithm implemented with the private key.

20. The method of claim 19, wherein a number of characters output during the secure text generation process as a result of entering a single character via the text input device changes based on the number of recursive loops indicated by the amplification factor.

* * * * *